(12) United States Patent
Yang

(10) Patent No.: US 6,467,087 B1
(45) Date of Patent: Oct. 15, 2002

(54) METHOD FOR UPDATING A PRINTER FIRMWARE

(75) Inventor: Min-Hsiang Yang, Taipei (TW)

(73) Assignee: Destiny Technology Corporation, Taipei (TW)

(*) Notice: Subject to any disclaimer, the term of this patent is extended or adjusted under 35 U.S.C. 154(b) by 0 days.

(21) Appl. No.: 09/464,926

(22) Filed: Dec. 16, 1999

(30) Foreign Application Priority Data

Dec. 24, 1998 (TW) .................................. 87121585 A

(51) Int. Cl.[7] .............................................. G06F 9/44
(52) U.S. Cl. ...................................................... 717/168
(58) Field of Search ........................ 717/168, 169–178; 713/189–194; 709/200, 217–219

(56) References Cited

U.S. PATENT DOCUMENTS

| | | | |
|---|---|---|---|
| 5,450,589 A | * 9/1995 | Maebayashi et al. | 717/170 |
| 5,704,031 A | * 12/1997 | Mikami et al. | 709/221 |
| 5,878,256 A | * 3/1999 | Bealkowski et al. | 717/168 |
| 5,937,198 A | * 8/1999 | Nelson et al. | 717/173 |
| 6,247,168 B1 | * 6/2001 | Green | 717/176 |
| 6,282,700 B1 | * 8/2001 | Grover et al. | 717/170 |
| 6,345,385 B2 | * 2/2002 | Imamura et al. | 717/120 |
| 6,357,021 B1 | * 3/2002 | Kitagawa et al. | 714/41 |

OTHER PUBLICATIONS

IBM Technical Disclosure Bulletin. Update Mechanism for Personal Computer System Resident Firmware. Mar. 1992. pp. 133–136.*
IBM Technical Disclosure Bulletin. Dual Indirect Ram/Rom JUMP Tables for Firmware Updates. Jun. 1988. pp. 294–298.*

* cited by examiner

Primary Examiner—Gregory Morse
Assistant Examiner—Wei Zhen
(74) Attorney, Agent, or Firm—Powell, Goldstein, Frazer & Murphy, LLP

(57) ABSTRACT

A method for updating a printer firmware is disclosed. The method achieves updating a printer firmware by use of downloading a printer firmware from the network or some media. More specifically, a Printer Job Language (PJL) Download Command of printer firmware is downloaded through an input port of the printer, such as serial port, parallel port or a network interface. The Printer Firmware Blocks of the printer firmware are then written into a nonvolatile memory of the printer, such as a Flash ROM to achieve in printer firmware updating.

20 Claims, 2 Drawing Sheets

METHOD FOR UPDATING A PRINTER FIRMWARE

BACKGROUND OF THE INVENTION

1. Field of the Invention

The present invention is related to a method for updating printing systems, more particularly, to a method for updating a printer firmware which is downloaded from the Internet or some media.

2. Description of the Prior Art

Nowadays, a printer has become a dispensable periphery for a computer as the computer industry is growing explosively and the demand for printing documents from a computer is more and more widely created. For the present, three types of printers, typically, are on the market. In view of the color issue, gray level printing technologies of the past printers have been enhanced and converted into colorful printing technologies. Additionally, the printing speed and the printing quality have also rapidly improved. In another aspect, the gradually decreased cost of the printer has made it possible to be prevailing and widely used from offices to homes.

A typical printer is composed of two main sections: an electronic circuit-based control section and a mechanical apparatus section, wherein the mechanical apparatus section approximately an engine, which is substantially the same as the engine of a Photostat, while the electronic circuit-based control section plays a crucial role for the printer. The electronic circuit-based control section is located on a control board, generally named a controller, comprising a processor, a ROM, a RAM, a font interface, a video frequency interface and the like.

In a printer, a firmware, controlling a printing action, is sent to a ROM, which is permanently stored therein and is not amendable by users. When something wrong undesirably happens to the printer, especially to the firmware of the printer such as the firmware code is wrongly located on the ROM, the users can do nothing about printer repairing but turn to service offered by the manufacturer. Moreover, when the printer system needs to be extended to have some new functions, and all the users can do is ask for a replacement for the ROM from the manufacture.

In light of the aforementioned drawbacks the conventional printer has been suffering, there is a need to develop a method for overcoming the issues that are raised in updating a printer firmware.

SUMMARY OF THE INVENTION

The object of the present invention is to provide a method for updating a printer firmware of a printer. By use of downloading the new-version printer firmware from the Internet or some media and sending the new-version printer firmware into a nonvolatile memory, the updating job for a printer firmware is thus easily achieved.

The present invention provides a method for updating a printer firmware. A new-version printer firmware is downloaded from the network or some media. A Printer Job Language (PJL) Download Command of printer firmware is downloaded through an input port of the printer, such as serial port, parallel port or a network interface. The Printer Firmware Blocks of the printer firmware are then written into a nonvolatile memory of the printer, such as a Flash ROM, so that a printer firmware updating job is thus achieved. After updating the printer firmware, a checking process is executed to confirm whether the updating process is successfully completed, and the checking result is displayed on a computer display. The updating method according to the present invention not only can be executed upon the printer is powered, but also can be executed after some general function conducted by the printer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention provides a method for updating a printer firmware. Using the method, the users can self-update the firmware of the printer, which not only facilitates the users but the manufacturers. To acquire a specific new-version printer firmware, the network, soft diskettes or compact disks may be the best source. Among them, downloading the firmware from the network is accepted widely and is often viewed as the best way. In the old regime of updating printer firmware, the chip having the printer firmware therein must be replaced by a new one in that the printer firmware is programmed in a ROM and is not amendable in the prior art. Unlike the old-fashioned printer, a nonvolatile memory for storing the printer firmware is instead adopted.

According to the present invention, a downloader is given and programmed at the position where is executed when booting the printer; that is, once the printer is booted, the downloader is automatically executed. The downloader can receive information from a serial port, a parallel port or even a network interface card thereof and then show the processing message on the display of the computer. Once the power of the printer is turned on, the downloader of the printer automatically checked whether a specific value (an identification code) of a specific position is present. If yes, a printer firmware has been located in the printer and is known. At the time, the downloader jumps to the start of the printer firmware to execute a series of actions. Otherwise, the downloader goes through steps of downloading printer firmware, and then shows the message on the display of the computer.

Figure 1:
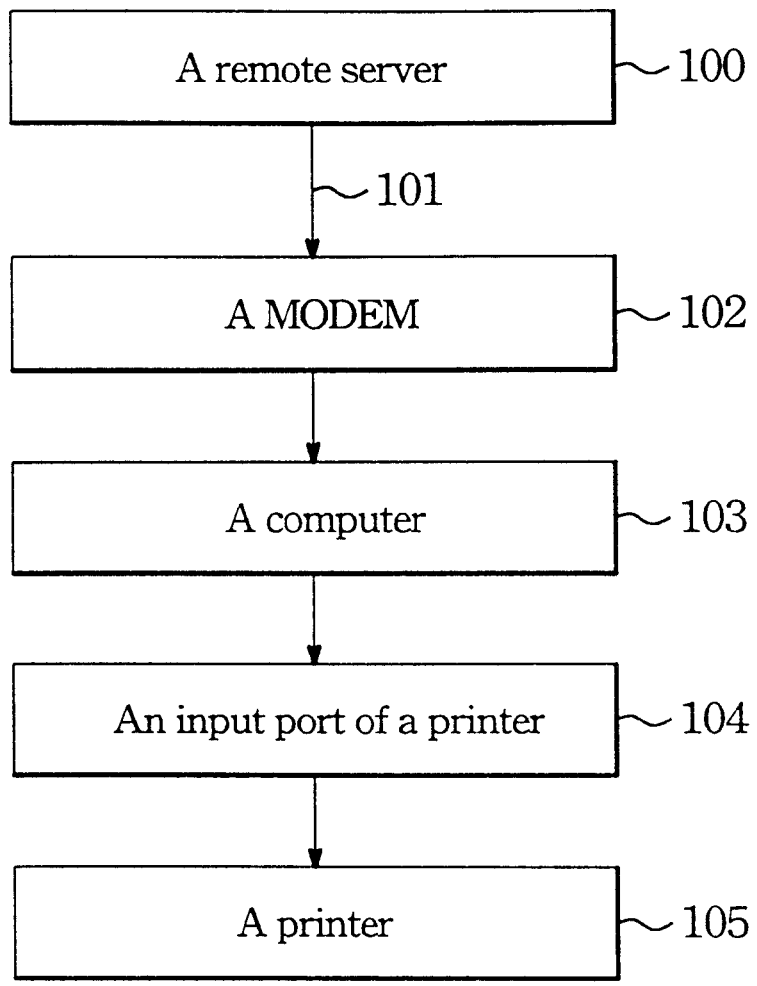
FIG. 1 is a block diagram of updating a printer firmware for a printer according to the present invention, wherein the printer firmware is available from a remote server.

FIG. 1 shows printer firmware flows from a remote server to a printer when updating a printer firmware according to the present invention. In a preferred embodiment, when updating for a printer firmware needs to proceed, a user first downloads a new-version printer firmware through the network 101 from a remote server 100 to a computer 103. A computer 103 is connected to the network 101 through a MODEM 102. While the printer 105 is connected with the computer 103, the downloaded new-version printer firmware in the computer is then transmitted to the printer 105 through an input port 104 of the printer, such as a serial port, a parallel port, a network interface card (NIC) and the like. Then the new-version printer firmware can work properly again for the printer. Moreover, the downloaded printer firmware format contains three main segments, which are respectively PJL Download Command, Printer Firmware Blocks, and End Block. By writing the Printer Firmware Blocks into a nonvolatile memory of the printer, such as a Flash ROM, the downloaded new-version printer firmware thus becomes the current working firmware for the printer. Additionally, a checking process is launched to see if the printer firmware updating has been completely finished. After the checking process, the checking result is shown to the user as a message on the computer display, so that the user can well monitor throughout the processing of the firmware updating in the printer.

Figure 2:
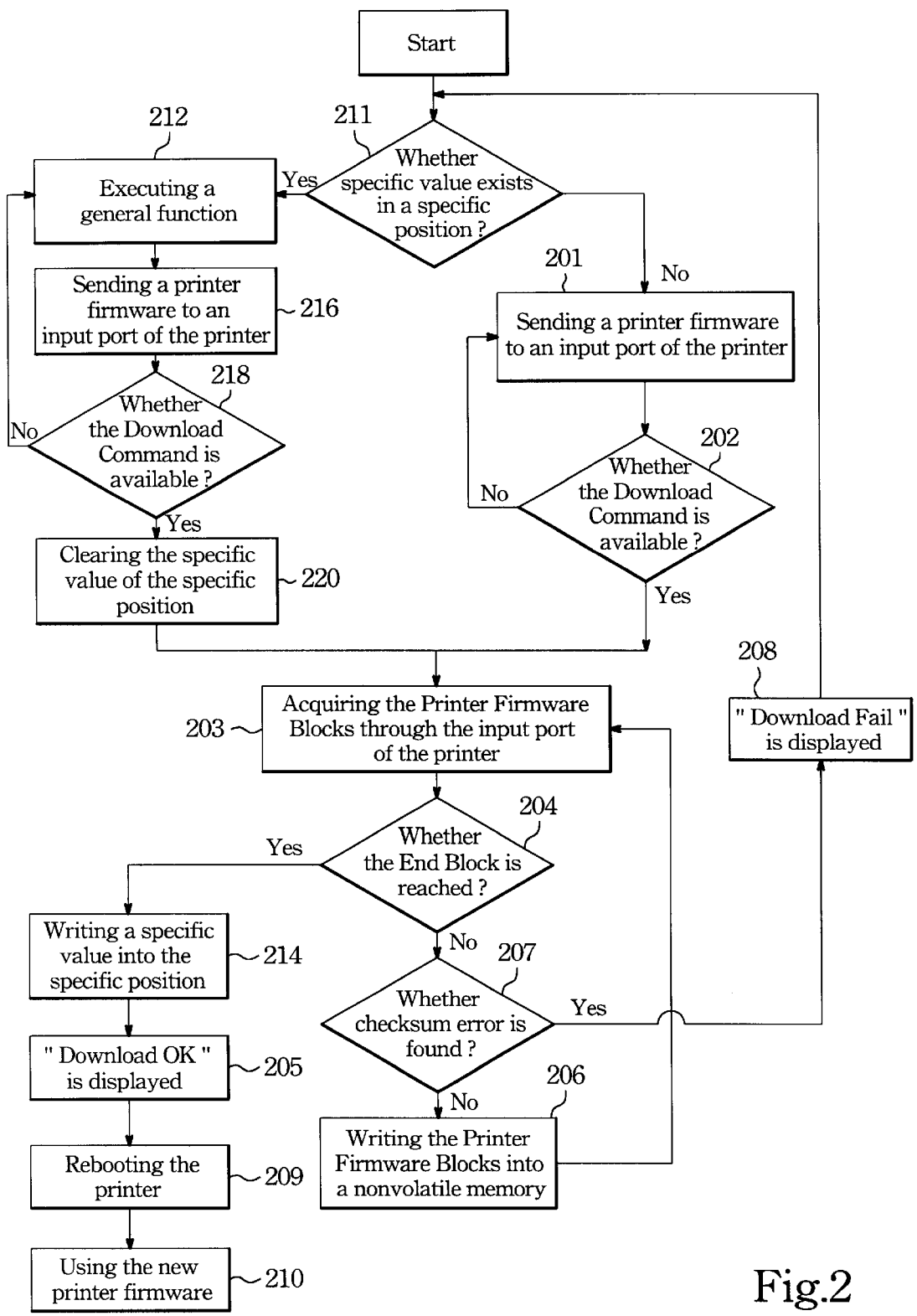
FIG. 2 is a flow chart for updating a printer firmware according to the present invention.

Referring to FIG. 2, which states the printer firmware updating flow according to the present invention. When the printer is booted, the downloader which has been programmed at the position where is executed when booting the printer checks depending on whether a specific value (an identification code) exists in a specific position (Step 211). If yes, an information indicative of the existence of a printer firmware in the printer is obtained. At the time, the downloader skips updating steps to the initial position of the original printer firmware to conduct a general function (Step 212), such as printing a document. Otherwise, the downloader executes a printer firmware downloading job to update the current printer firmware accompanied with the message shown in the display of the computer.

In accordance with the present invention, the new-version printer firmware downloaded from the network to the computer is divided into three segments, including the PJL (Printer Job Language) Download Command, a plurality of Printer Firmware Blocks, and an End Block. When the printer is properly connected with the computer, the computer can send the new-version printer firmware to the printer through an inputting port of the printer (Step 201). Alternatively, this can be achieved by a CD-ROM or a soft drive of the computer for transmitting the printer firmware to the printer through the input port of the printer, such as a serial port, a parallel port or a network interface card (NIC). Subsequently, a Download Command, in the format of the Printer Job Language (PJL), is checked whether it is available (Step 202). The PJL Download Command is used to inform a location that the printer firmware should be written to. If the PJL Download Command is not available, the process of sending the new-version printer firmware to the printer is repeated (Step 201). If the PJL Download Command is available, the Printer Firmware Blocks (Step 203) are then acquired through the input port of the printer with a block by block manner.

Alternatively, the printer firmware updating job can be executed after the general function has been executed and finished (Step 212), instead of the time of booting the printer as mentioned above. The network, the CD-ROM or the soft drive provides the computer with a new printer firmware, which is then delivered to the printer through the input port of the printer (Step 216). Subsequently, the PJL Download Command is checked whether it is available (Step 218). If the PJL Download Command is not available, the updating process is abandoned and the printer succeeds by going back to execute the general function. However, if the PJL Download Command is available, the identification code of the specific position is first cleared (Step 220). Then the Printer Firmware Blocks of the new printer firmware are downloaded to the input port of the printer (Step 203).

The Printer Firmware Blocks are thus written into the memory of the printer, wherein the whole writing process is monitored to see whether the End Block is reached (Step 204). If the End Block is not reached, a check is made to determine whether a checksum error is found (Step 207) to confirm that the Printer Firmware Blocks are completely obtained without errors. If a checksum error is found, the computer display shows the message "Download Fail" (Step 208), and the updating process goes back to the step 211. If no checksum error is found, the Printer Firmware Blocks are consecutively written into a nonvolatile memory, such as a Flash ROM (Step 206) until the End Block is reached. If the End Block is reached, which indicates the writing process has been finished, an identification code of a specific value is written into the specific position (Step 214). The message of "Download OK" is then shown on the computer display (Step 205). Finally, the printer needs to be rebooted to use the newly updated printer firmware (Step 210).

According to the description stated above, the present invention discloses a method for updating a printer firmware. The users use the wide network or some media as new-version printer firmware source. Then the new-version printer firmware is downloaded through the input port to the nonvolatile memory of the printer. The printer firmware updating is then easily achieved. Better yet, the functionality offered by the hardware of the printer is thus enhanced up to an utmost extent. Therefore, updating a printer firmware based on the proposed strategy for a printer is very much a convenient, cost-efficient and prominent method in in the views of both users and maufacturers.

As is understood by a person skilled in the art, the foregoing preferred embodiments of the present invention are illustrative of the present invention rather than limiting of the present invention. They are intended to cover various modifications and similar arrangements included within the spirit and scope of the appended claims, the scope of which should be accorded the broadest interpretation so as to encompass all such modifications and similar structures.

What is claimed is:

1. A method for updating a printer firmware for a printer, comprising the steps of:

checking whether a specific identification code exists in a specific position;

sending a new-version printer firmware to an input device of said printer when said specific identification code is absent;

confirming whether a Download Command exists in said new-version printer firmware;

inputting a Printer Firmware Block of said new-version printer firmware when said Download Command is available;

writing said Printer Firmware Block of said new-version printer firmware into a memory of said printer when an End Block of said new-version printer firmware is not reached;

executing repeatedly said step of inputting said Printer Firmware Block of said new-version printer firmware and said step of writing said Printer Firmware Block of said new-version printer firmware into said memory of said printer until said End Block is reached;

writing said specific identification code into said specific position; and rebooting said printer to use said new-version printer firmware.

2. The method according to claim 1, wherein said step of confirming whether said Download Command exists in said new-version printer firmware further comprises the step of:

executing repeatedly said step of sending said new-version printer firmware to said input device of said printer until said Download Command is present, when said Download Command is absent.

3. The method according to claim 1, wherein said step of writing said Printer Firmware Block of said new-version printer firmware into said memory of said printer further comprises the steps of:
  determining whether there exists a checksum error; and
  re-executing said step of checking whether said specific identification code exists in said specific position, when a checksum error is found.

4. The method according to claim 1, wherein said step of checking whether said specific identification code exists in said specific position further comprises the step of:
  executing a general function of said printer when said specific identification code exists.

5. The method according to claim 4, wherein said step of executing said general function for said printer further comprises an alternative method of updating said printer firmware, said alternative method comprises the steps of:
  sending said new-version printer firmware to said input device of said printer;
  confirming whether said Download Command exists in said new-version printer firmware;
  clearing said specific identification in said specific position when said Download Command is available;
  inputting said Printer Firmware Block of said new-version printer firmware;
  writing said Printer Firmware Block of said new-version printer firmware into said memory of said printer when said End Block is not reached;
  executing repeatedly said step of inputting said Printer Firmware Block of said new-version printer firmware and said step of writing said Printer Firmware Block of said new-version printer firmware into said memory of said printer until said End Block of said new-version printer firmware is reached;
  writing said specific identification code into said specific position; and
  rebooting said printer to use said new-version printer firmware.

6. The method according to claim 5, wherein said step of confirming whether said Download Command exists in said new-version printer firmware further comprises the step of:
  re-executing said general function of said printer and stopping said steps of said alternative method of updating said printer firmware when said Download Command is not present.

7. The method according to claim 1, wherein said step of sending said new-version printer firmware to said input device of said printer is performed by downloading said new-version printer firmware from a remote server through a network.

8. The method according to claim 1, wherein said step of sending said new-version printer firmware to said input device of said printer is performed by inputting said new-version printer firmware from a CD-ROM of a computer.

9. The method according to claim 1, wherein said Download Command is in a Printer Job Language (PJL) format.

10. The method according to claim 1, wherein said step of sending said new-version printer firmware to said input device of said printer is performed in a block by block manner.

11. The method according to claim 1, wherein said new-version printer firmware contains a Download Command, a plurality of Printer Firmware Blocks, and an End Block.

12. The method according to claim 1, wherein said memory of said printer is a Flash ROM.

13. A method for updating a printer firmware for a printer, comprising the steps of:
  checking whether a specific identification code exists in a specific position;
  executing a general function when said specific identification code exists;
  sending a new-version printer firmware to an input device of said printer with a block by block manner;
  confirming whether a Download Command exists in said new-version printer firmware;
  clearing said specific identification code in said specific position when said Download Command is available;
  inputting a Printer Firmware Block of said new-version printer firmware;
  writing said Printer Firmware Block of said new-version printer firmware into a nonvolatile memory of said printer when an End Block of said new-version printer firmware is not yet reached;
  executing repeatedly said step of inputting said Printer Firmware Block of said new-version printer firmware and said step of writing said Printer Firmware Block of said new-version printer firmware into said nonvolatile memory of said printer until said End Block is reached;
  writing said specific identification code into said specific position; and
  rebooting said printer to use said new-version printer firmware.

14. The method according to claim 13, wherein said step of confirming whether said Download Command exists in said new-version printer firmware further comprises the step of:
  re-executing said general function of said printer and stopping said steps of said method for updating said printer firmware when said Download Command is not present.

15. The method according to claim 13, wherein said step of writing said Printer Firmware Block of said new-version printer firmware into said memory of said printer further comprises the steps of:
  determining whether there exists a checksum error; and
  re-executing said step of checking whether said specific identification code exists in said specific position, when said checksum error is found.

16. The method according to claim 13, wherein said step of checking whether said specific identification code exists in said specific position further comprises the step of:
  sending said new-version printer firmware to said input device of said printer with a block by block manner when said specific identification code is not present;
  confirming whether said Download Command exists in said new-version printer firmware;
  inputting said Printer Firmware Block of said new-version printer firmware when said Download Command is available;
  writing said Printer Firmware Block of said new-version printer firmware into said nonvolatile memory of said printer when said End Block is not reached;
  executing repeatedly said step of inputting said Printer Firmware Block of said new-version printer firmware and said step of writing said Printer Firmware Block of said new-version printer firmware into said nonvolatile memory of said printer until said End Block of said new-version printer firmware is reached;
  writing said specific identification code into said specific position; and
  rebooting said printer to use said new-version printer firmware.

17. The method according to claim 13, wherein said step of sending said new-version printer firmware to said input device of said printer is performed by downloading said new-version printer firmware from a remote server through a network.

18. The method according to claim 13, wherein said step of sending said new-version printer firmware to said input device of said printer is performed by inputting said new-version printer firmware from a CD-ROM of a computer.

19. The method according to claim 13, wherein said Download Command is in a Printer Job Language (PJL) format.

20. The method according to claim 13, wherein said new-version printer firmware contains a Download Command, a plurality of Printer Firmware Blocks, and an End Block.

* * * * *